United States Patent [19]

Stanfa

[11] Patent Number: 4,827,998
[45] Date of Patent: May 9, 1989

[54] TIRE REPAIR PLUG
[76] Inventor: Joseph Stanfa, 1004 Greenlawn Blvd., Round Rock, Tex. 78664
[21] Appl. No.: 116,161
[22] Filed: Nov. 3, 1987
[51] Int. Cl.[4] .............................................. B60C 21/06
[52] U.S. Cl. ...................................... 152/368; 152/370
[58] Field of Search ............... 152/370, 372, 367, 368; 156/97, 369

[56] References Cited

U.S. PATENT DOCUMENTS

| | | | |
|---|---|---|---|
| 570,942 | 10/1896 | Merritt | 152/370 |
| 2,727,554 | 12/1955 | Westfall | 152/370 |
| 3,296,048 | 1/1967 | Wolfe | 152/370 |
| 3,842,887 | 10/1974 | Mendes | 152/370 |
| 4,279,343 | 7/1981 | Alfanta | 152/370 X |
| 4,579,161 | 4/1986 | Roberts | 152/370 |

OTHER PUBLICATIONS

Forbush, A. D., "Giant Earthmover Tire Repair by Vuka Bolted," sales pamphlet, The Forbush Co., Aug., 1952.

Primary Examiner—David Simmons
Assistant Examiner—Jeff H. Aftergut
Attorney, Agent, or Firm—Richard C. Litman

[57] ABSTRACT

A plug for repairing steel belted tires includes an insert member having a shank containing threads and joined to an uppermost wedge element provided with a tool engaging recess. A resilient shroud encases the majority of the insert member and includes external threads on its lower portion whereupon the shank threads interlock the insert and shroud such that as the insert is screwed into a tire puncture, the shroud is simultaneously screwed into the tire and insures an enhanced securing and sealing action.

7 Claims, 2 Drawing Sheets

TIRE REPAIR PLUG

FIELD OF INVENTION

This invention relates to an improved plug for tire repair and more particularly, to a device for repairing puncture holes such as caused by nails or other foreign objects, in steel belted tires.

BACKGROUND OF THE INVENTION

The instant invention relates to tire repair devices and plugs and especially to an improved simple and easy to use means for the repair of hold punctures that requires only a screwdriver to install the device to effect a permanent repair.

An insert member is provided with thread means thereon allowing even an uninitiated motorist to insert and secure the device with a simple handtool. Positive sealing and retention is assured by an integral wedge element having an upper, transverse planar surface including means for receiving a screwdriver blade to permit threading of the device into a nail puncture hole in the tire.

The present invention utilizes a resilient property of tires, especially steel belted tires, in that as the device is installed, the plug is drawn into and through the thickness of the tire and a portion of the tread area enfolds about and over a portion of the head of the plug, such that a most positive sealing of the puncture is achieved. This sealing, plus a stable retention of the plug, is enhanced due to the provision of a plug having a somewhat resilient shroud encasing a rigid core element and wherein both components are provided with interlocking thread portions. Further, the installed plug will be understood to pass through a plurality of steel belts which additionally anchor its installation.

DESCRIPTION OF THE PRIOR ART

The following cited references are found to be exemplary of the prior art:

| U.S. Pat. No. | Inventor |
| --- | --- |
| 2,902,074 | Langdon |
| 3,174,524 | Nitzsche |
| 3,175,599 | Clifford |

U.S. Pat. No. 2,902,074 to Langdon discloses a tire plug made of rubber-like material adapted to repair punctured pneumatic tires.

U.S. Pat. No 3,174,524 to Nitzsche teaches the construction of a tire plug for single tube tires adapted for insertion from outside of a tire.

U.S. Pat. No. 3,175,599 to Clifford discloses a sealing plug adapted to readily conform to the shape of puncture holes of pneumatic tires.

None of the above cited prior art, whether taken singly or in any combination, discloses the specific features of the present invention in any way so as to bear upon the claims as appended hereto.

SUMMARY OF THE INVENTION

An object of the present invention is to provide an improved plug device for sealing puncture holes in tires with a minimum of handtools necessary and which provides an efficient and permanent installation.

Another object is to provide a seating or installation of a puncture repair plug so as to cause the tire material to contain or secure the plug, thereby permanently affixing the device within the tire.

Still another object is to secure a repair plug against the loosening effects of tire flexure and to provide a bonding or sealing of the plug relative the surrounding tire material to effect a compound sealing arrangement between the device and the tire with the compound sealing aiding materially in the longevity of the repair.

DESCRIPTION OF THE DRAWINGS

Similar reference characters designate corresponding parts throughout the several figures of the drawings.

DESCRIPTION OF THE PREFERRED EMBODIMENT

Figure 1:
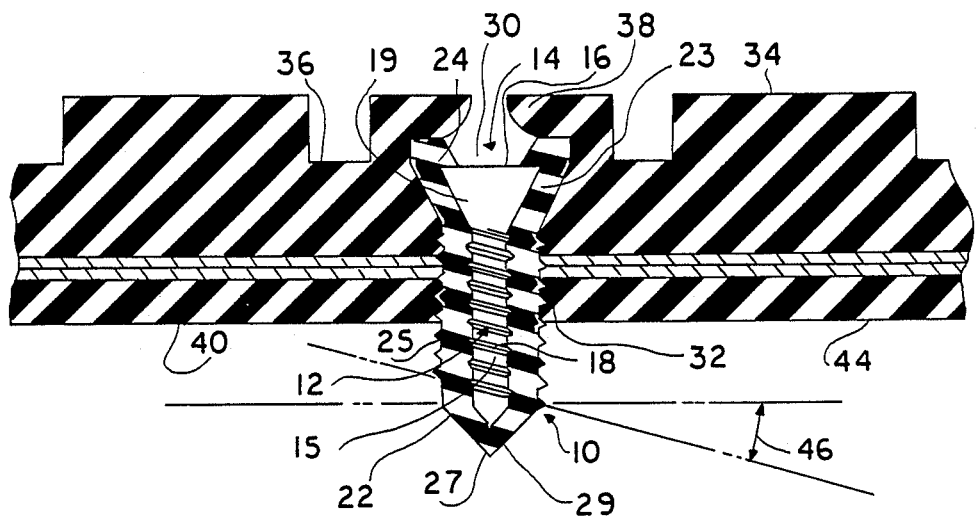
FIG. 1 is a transverse sectional view of a tire carcass illustrating the plug device of the invention as it appears when installed through a puncture hole.
Figure 2:
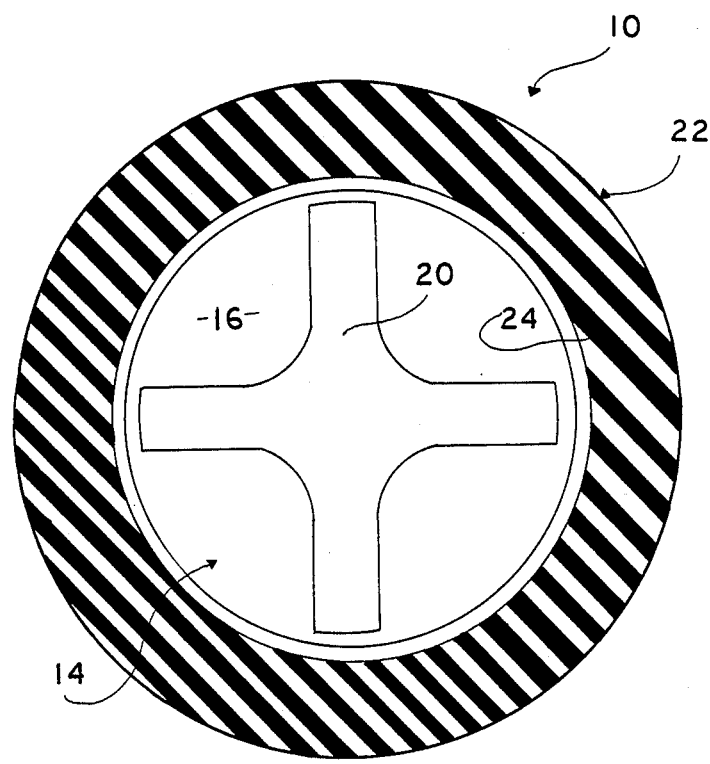
FIG. 2 is an enlarged top plan view of the upper planar surface of the plug device and its recess for receiving the blade of an installation tool such as a screwdriver.

Referring now to the drawings, particularly FIG. 1, the present invention will be seen to comprise a unitary assembly comprising a plug device, generally designated 10 and which includes a core or insert member 12 provided with an uppermost head or wedge element 14 having an upper planar surface 16. As shown in FIG. 2, a slotted recess 20 countersunk in the surface 16 of the head 14 is adapted to receive the tip of a mating screwdriver blade as will be described hereinafter. A cruciform recess is illustrated, such as would be used with a Phillips screwdriver but quite obviously, a single straight slot may be provided for use with a regular bladed screwdriver.

The lower portion of the insert 12 includes a tapered shank 15 provided with screw threads 18 which may comprise any standard thread having a pitch or angle at 46 from the horizontal of 25 to 50 degrees. The conical surface 19 of the wedge element 14 preferably is inclined downwardly and inwardly between 20 to 60 degrees from the vertical.

The hard metal or other material of the insert 12 is encased by a pliable shroud or outer covering 22 which will be seen to firmly engage all of the periphery of the core member 12 with the exception of the central portion of the planar area 16, which is exposed for the insertion of a handtool blade. The covering 22 may be of any suitable resilient material such as rubber or the like and the top edge 24 thereof will be seen to firmly overlie the outer periphery of the core planar surface 16 such that the shroud 22 is firmly united with the core member 12.

The exterior of shroud 22 generally conforms to the configuration of the encased core 12. That is, the upper portion is tapered or wedge shaped as at 23 while the lower portion surrounding the core shank 15 is provided with external screw threads 25 and terminates in a lowermost conical point 27 axially aligned with the point 29 on the tip of the core shank.

In the use of the repair device of this invention, the tip 27 of the plug 10 is pressed into the outer, exposed opening defined by the puncture 32 and then the blade of an appropriate screwdriver tool (not shown) is inserted into the plug recess 20. As downward pressure is applied, the tool is rotated to advance the plug into the tire body. This action is assured as the shroud threads 25 bite into the wall of the puncture 32. Even though the arcuate force is being applied to the core member 12 it will be understood that in view of its threads 18 thereon, this force is simultaneously transmitted to the surrounding shroud 22 and the assembly of the two components act in unison. This screw action and advancement of the plug continues until the core top surface 16 is well below the tire tread level 34 and has at least reached the level of the groove bottoms 36 as shown in FIG. 1. In this manner, the body of rubber tire material above the top of the inserted plug 10 will be seen to close back inwardly over the plug top and forms a bulbous, inwardly directed extension 38 substantially overlying a portion of the plug top.

With the above described construction, the installed plug is securely anchored within the tire carcass with the external threads 25 passing through and tightly engaging the steel belts while the lower tip 27 is disposed beyond the inner wall 42 of the casing lining 44. During the above installation, the limited resilience of the shroud 22 will be slightly compressed as it resists the natural resilience of the tire material, such that not only is a positive anchoring of the plug achieved, but also, a vastly enhanced seal is maintained by the inserted plug.

It will be apparent from the foregoing disclosure that the object and advantages of the invention have been realized. Further, since numerous small changes will occur to those skilled in the art, the foregoing should be considered as illustrative of the principles of the invention and all equivalents thereof would be considered to fall within the scope of the invention.

What is claimed is:

1. A plug for repairing a puncture hole in a tire comprising;
   an insert having an upper wedge element with a periphery and a lower shank, said wedge element being provided with an upper surface having tool engaging means thereon, and a conical surface, said conical surface being inclined downward and inward at an angle of between 20 to 60 degrees from the vertical,
   a shroud of resilient material encasing said lower shank and at least a portion of said wedge element,
   external threads on a portion of said shroud encasing said lower shank, and
   locking means on said lower shank radially securing said shroud to said insert.
2. A plug according to claim 1 wherein,
   said tool engaging means includes a recess configured to mate with a screwdriver tip.
3. A plug according to claim 1 wherein,
   said locking means includes a screw thread.
4. A plug according to claim 1 wherein,
   said wedge element includes an inverted conical surface.
5. A plug according to claim 1 wherein,
   said shroud includes a top edge overlying the periphery of said wedge element upper surface.
6. A plug according to claim 1 wherein,
   said insert and shroud include a lowermost conical tip.
7. A plug according to claim 3 wherein,
   said screw thread defines an angle of 25 to 50 degrees from a horizontal plane.

* * * * *